(12) United States Patent
Taylor (10) Patent No.: US 9,050,922 B1
(45) Date of Patent: Jun. 9, 2015

(54) TIE DOWN DEVICE

(71) Applicant: Timothy M. Taylor, Old Town, ME (US)

(72) Inventor: Timothy M. Taylor, Old Town, ME (US)

( * ) Notice: Subject to any disclaimer, the term of this patent is extended or adjusted under 35 U.S.C. 154(b) by 0 days.

(21) Appl. No.: 14/467,897

(22) Filed: Aug. 25, 2014

(51) Int. Cl.
   *B60P 7/08* (2006.01)

(52) U.S. Cl.
   CPC ............... *B60P 7/083* (2013.01); *B60P 7/0853* (2013.01)

(58) Field of Classification Search
   CPC .............................. B60P 7/083; B60P 7/0853
   USPC ................... 410/12, 34, 50, 96, 97, 100, 117; 24/68 CD, 300, 301; 248/499
   See application file for complete search history.

(56) References Cited

U.S. PATENT DOCUMENTS

| | | | |
|---|---|---|---|
| 5,423,644 A * | 6/1995 | First, Sr. ....................... 410/100 |
| 6,988,713 B2 | 1/2006 | Walls |
| 7,739,775 B2 | 6/2010 | Shimanski |
| 8,141,212 B2 | 3/2012 | Fontaine et al. |
| 8,616,593 B2 | 12/2013 | Bruce et al. |
| 2002/0138952 A1* | 10/2002 | Chou |
| 2008/0110002 A1* | 5/2008 | Calkin et al. |
| 2009/0241300 A1* | 10/2009 | Ferguson |

* cited by examiner

*Primary Examiner* — Stephen Gordon
(74) *Attorney, Agent, or Firm* — Anthony D. Pellegrini (57) ABSTRACT

A tie down device comprised of a tie down strap and a ratchet take-up device, with the ratchet being suitable for taking up the tie down strap in order to change the effective length of the strap for use with different sized loads and to create tension over a load when securing it, with the tie down strap having a relatively long inelastic proximate portion and a relatively short elastic distal portion; such that the inelastic portion of the strap maintains tension on a load being secured and the elastic portion of the strap serves as an automatic re-tensioning means if the load shifts.

20 Claims, 10 Drawing Sheets

TIE DOWN DEVICE

BACKGROUND OF THE INVENTION

1. Technical Field

The present invention relates generally to the field of tie down devices, and more particularly to tie down straps used with ratchet devices.

2. Description of Prior Art

Tie down devices are well known in the art, as are tie down straps used with ratchet devices. Typical tie down strap/ratchet devices employ a substantially inelastic strap and a ratchet take-up device, with a first engagement device located at the distal end of the strap and a second engagement device located proximate to the ratchet. The engagement devices are typically hooks. The strap is taken up by the ratchet and wound about a drum, which shortens the effective length of the strap. Gearing in the ratchet prevents the drum from counter-rotating, thus maintaining the strap length under tension. A release mechanism built into the ratchet disengages the gearing and allows the strap to be unwound from the drum, lengthening the effective length of the strap. In use, the strap is placed over the object or objects to be tied down, the engagement devices are engaged with fixed objects, then the ratchet is used to take up the slack in the strap until the strap is taut over the object or objects intended to be secured. This configuration provides a practical device for securing differently sized objects, since the length of the strap can be as long or as short as needed, within its physical constraints.

Figure 2A:
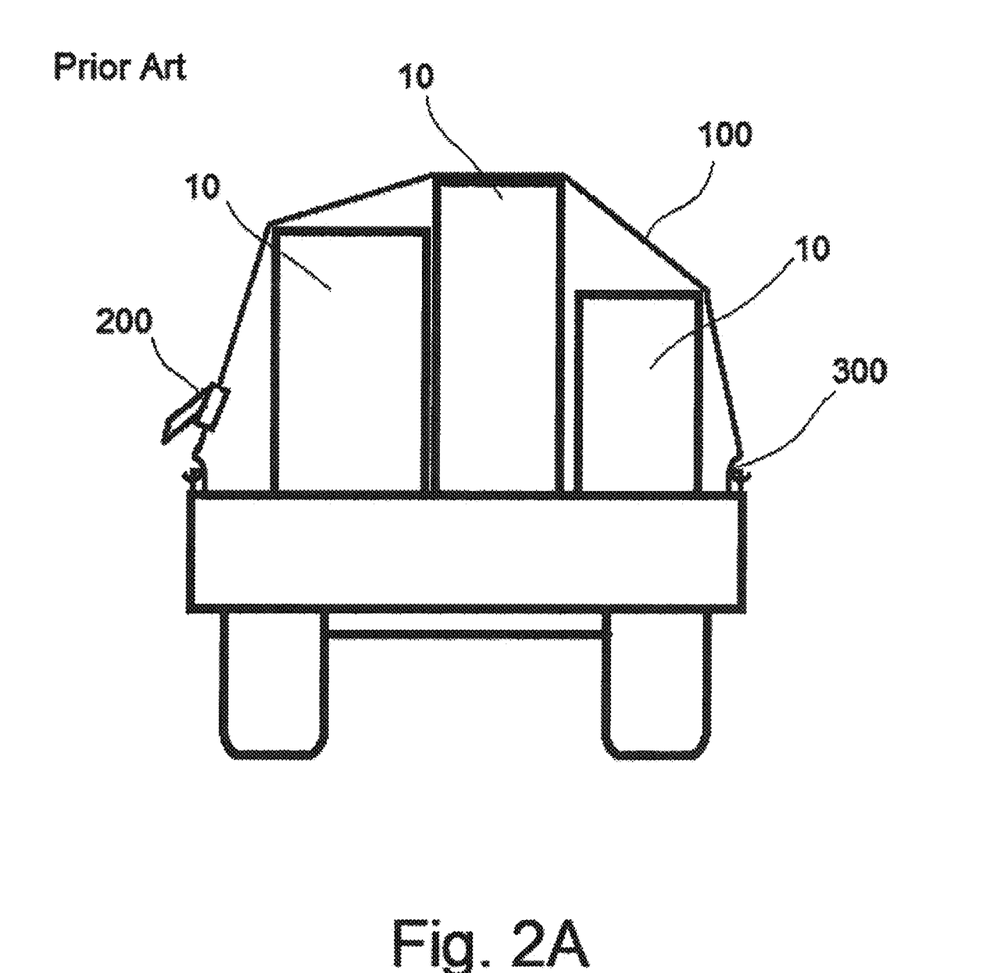
FIG. 2A is a stylized rear view of a truck carrying a load secured with a ratchet tie down device of the prior art.
Figure 2B:
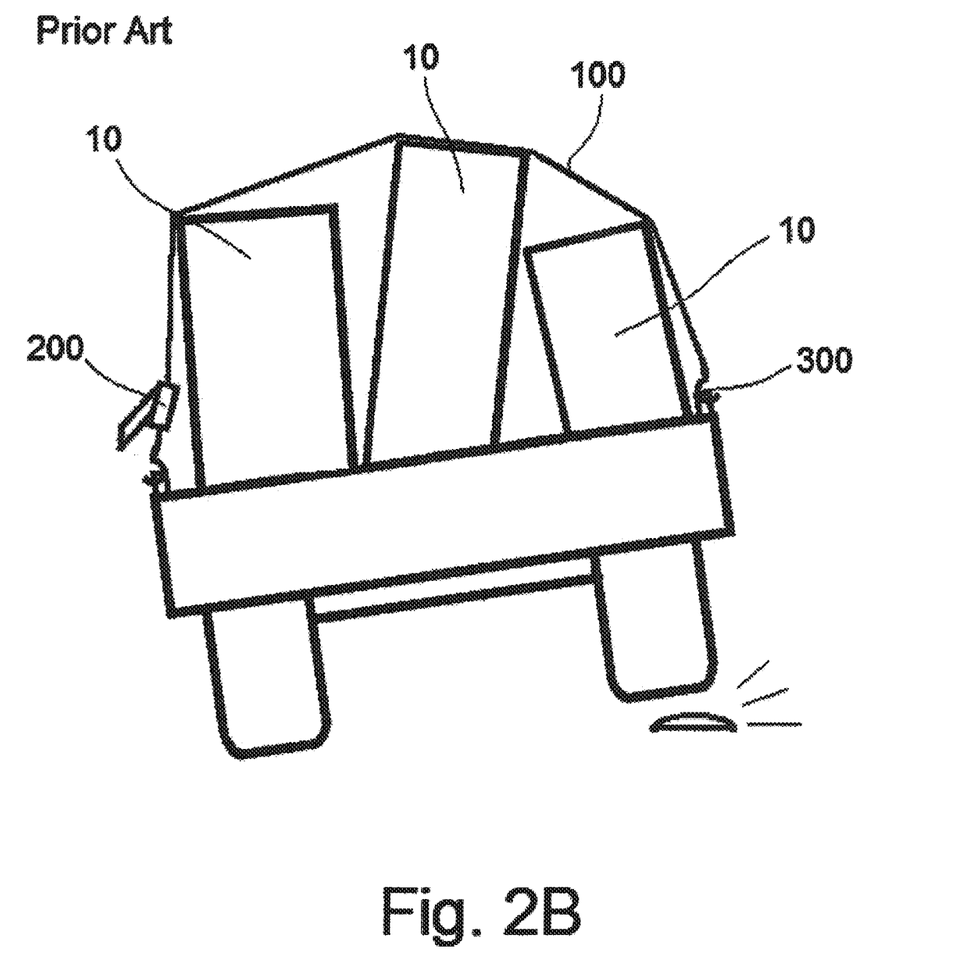
FIG. 2B is a stylized rear view of the truck depicted in FIG. 2A after it has hit a bump in the road, resulting in the load being jostled and slightly repositioned under the tie down strap of the tie down device of the prior art.
Figure 2C:
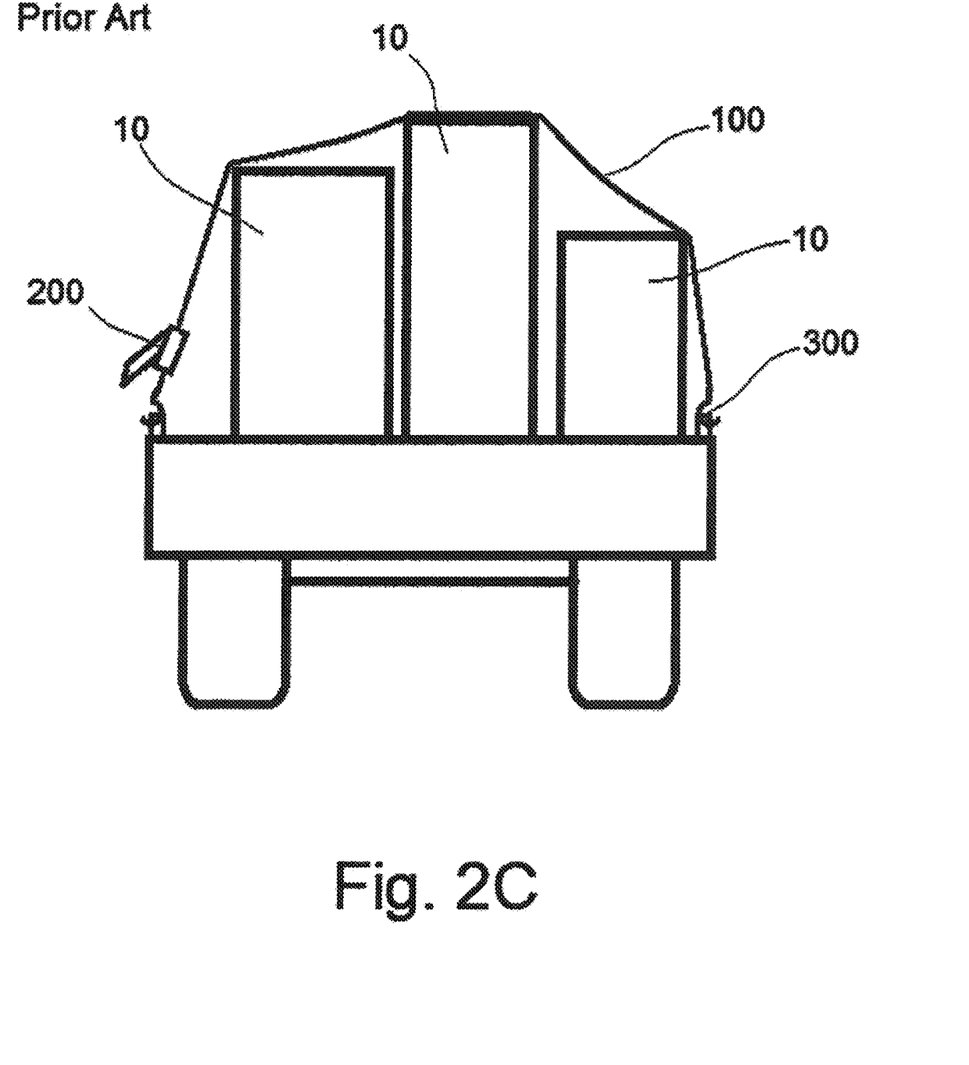
FIG. 2C is a stylized rear view of the truck depicted in FIG. 2A showing how the load has shifted and the tie down strap of the tie down device of the prior art is now slack.

While the above-described tie down strap/ratchet device adequately secures a stationary load, if the load is jostled during transport even slight relative movement of the object or objects being secured can result in a slackening of the tension of the strap. See FIGS. 2A-2C. Since the strap is substantially inelastic, any slack introduced to the strap remains and presents a danger of the load becoming less secure. Further jostling may introduce ever more slack to the strap until the load is no longer secured.

Another common tie down device uses an elastic elongate cord having an engagement device at each end. This is typically known as a bungee cord. A bungee cord is used by being placed over the object or objects to be tied down, then the engagement devices are engaged with fixed objects. Because the length of the bungee cord is less than the distance between the fixed objects, the cord is stretched over the object or objects intended to be secured, and the tension in the cord provides the securing means.

While the above-described bungee tie down device is capable of overcoming slack introduced through jostling of the load, it also has disadvantages. Because the bungee cord is of a fixed length, for any given load only a specially sized bungee cord will be adequate. This necessitates multiple bungee cords for different sized loads. Also, since the entire length of the bungee cord is elastic, even a taut bungee cord presents an unwanted amount of stretch. Thus, where slight jostling might not have created movement in a load secured by an inelastic strap, that same degree of jostling will, even if only temporarily, allow movement in the load. While the bungee cord will immediate retract to take up the slack, the total amount of movement of the load may be unacceptable and eventually result in dangerous shifting of the load.

The foregoing illustrates that there is a need in the art for an improved tie down device which incorporates the benefits of both typical tie down systems while avoiding their disadvantages.

It is therefore an objective of the present invention to provide a tie down device that is suitable for securing a load.

It is a further objective of the present invention to provide a tie down device that has a changeable effective length so that it may be used on different sized loads.

It is yet a further objective of the present invention to provide a tie down device that has a strap which is substantially inelastic for most of its length to minimize movement of a secured load.

It is yet a further objective of the present invention to provide a tie down device that has a strap which is substantially elastic for a short portion of its length to allow for automatic re-tensioning of the strap across a load which has shifted slightly.

It is yet a further objective of the present invention to provide a tie down device that is inexpensive to manufacture.

It is yet a further objective of the present invention to provide a tie down device that is easy to use.

Other objectives of the present invention will be readily apparent from the description that follows.

SUMMARY OF THE INVENTION

In one aspect, the present invention is directed to a tie down device using a tie down strap and a ratchet take-up device. The strap and ratchet are substantially similar to traditional tie down devices using a tie down strap and a ratchet take-up device except that a small portion of the distal end of the strap is made of an elastic material. The elastic portion of the strap may be capable of stretching to several times its unstretched length, but only if a substantial force is applied to it. Like prior art devices, the device of the present invention also has engagement components at the ends to secure the device to fixed anchor points.

Figure 3A:
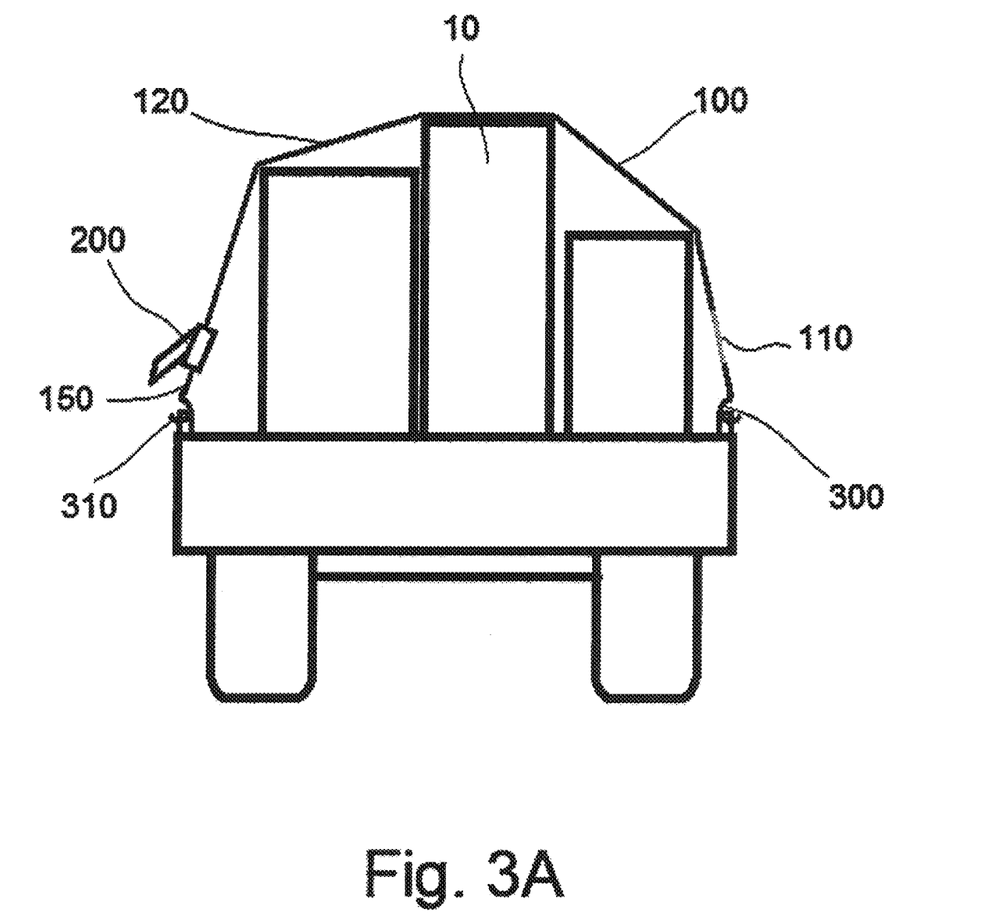
FIG. 3A is a stylized rear view of a truck carrying a load secured with a ratchet tie down device of the present invention.
Figure 3B:
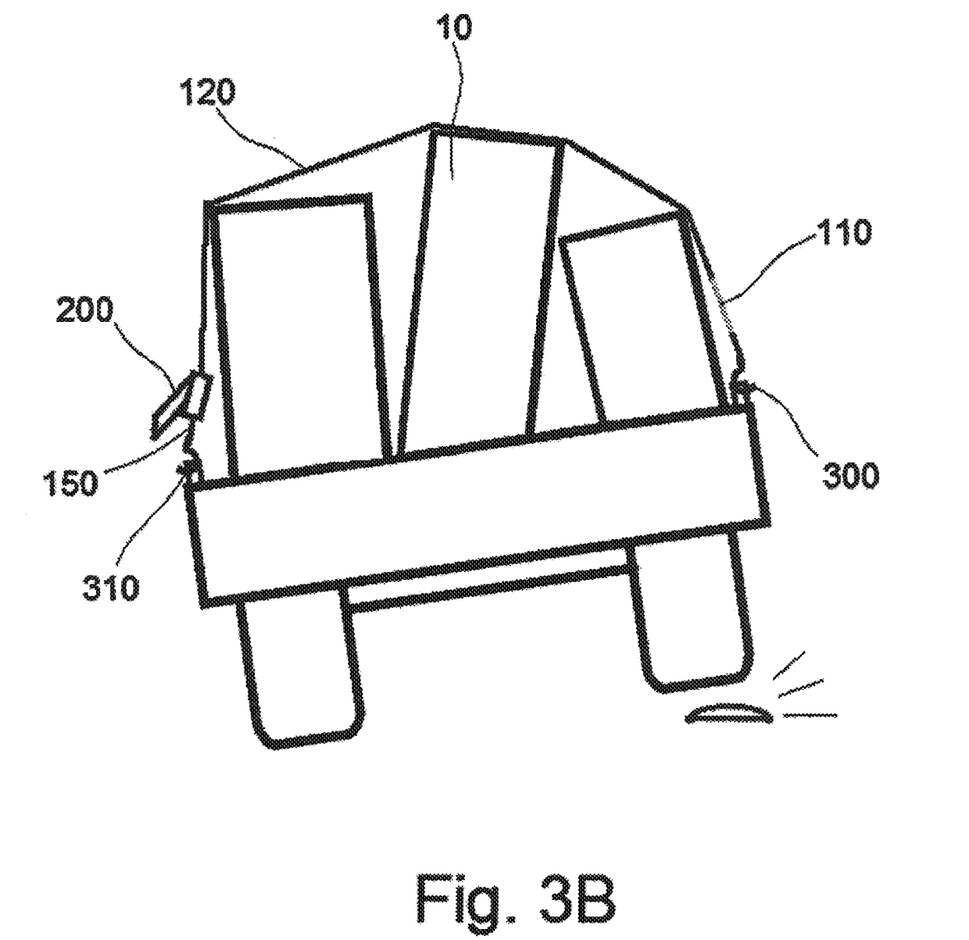
FIG. 3B is a stylized rear view of the truck depicted in FIG. 3A after it has hit a bump in the road, resulting in the load being jostled and slightly repositioned.
Figure 3C:
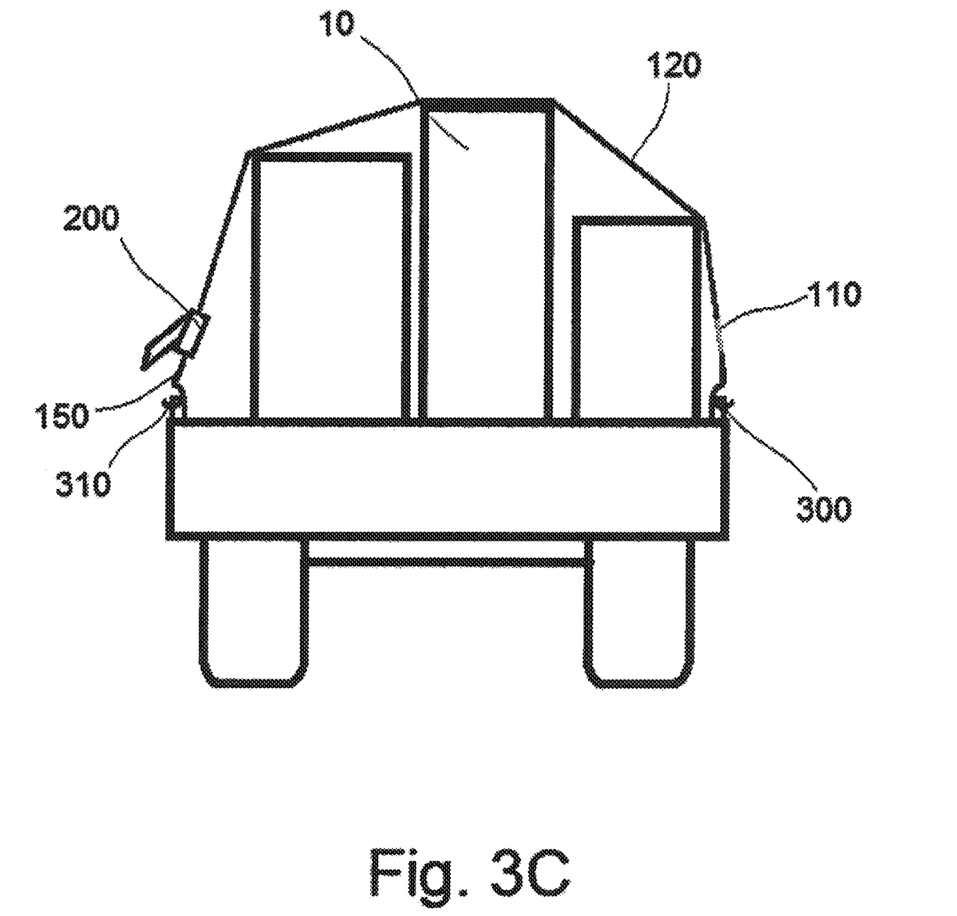
FIG. 3C is a stylized rear view of the truck depicted in FIG. 3A showing how the load has shifted, yet the tie down strap remains taut. The elastic portion of the strap is shown to have contracted somewhat in response to the slight repositioning of the load.
Figure 4A:
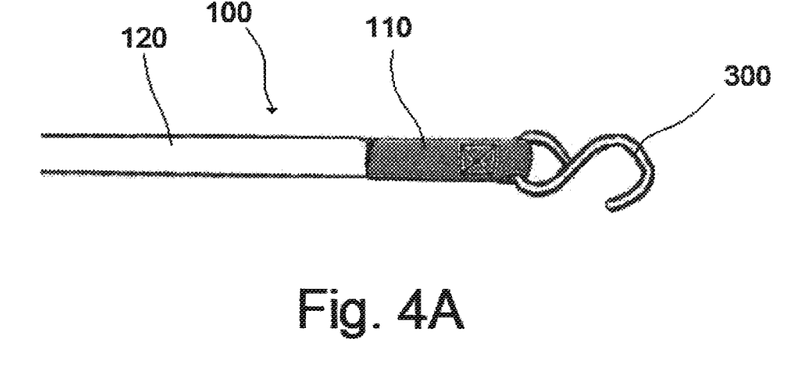
FIG. 4A is a perspective view of the embodiment of the strap and engagement member of the present invention depicted in FIG. 1A with the elastic portion of the strap in its unstretched state.
Figure 4B:
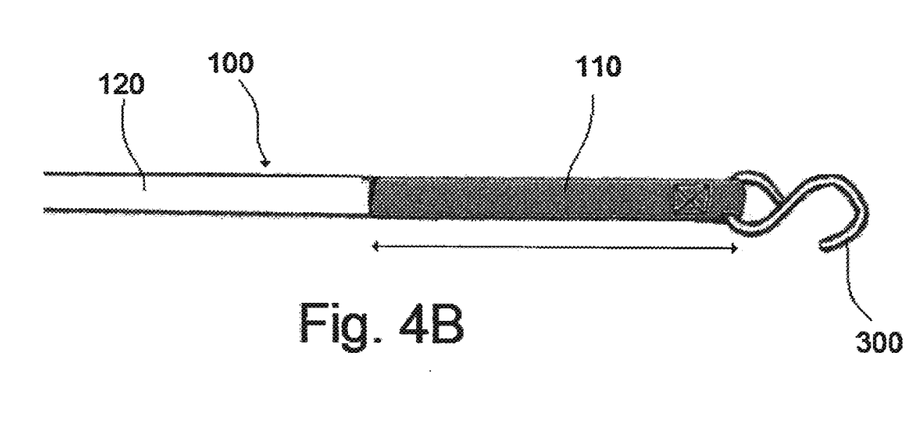
FIG. 4B is a perspective view of the embodiment of the present invention depicted in FIG. 4A with the elastic portion of the strap in its stretched state.
Figure 5A:
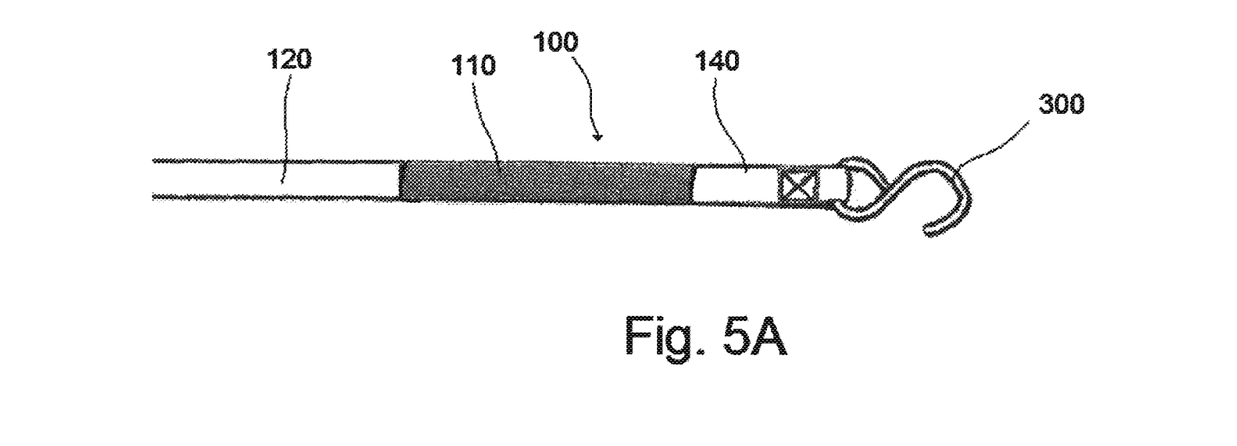
FIG. 5A is a perspective view of the embodiment of the strap and engagement member of the present invention depicted in FIG. 1B with the elastic portion of the strap in its unstretched state.
Figure 5B:
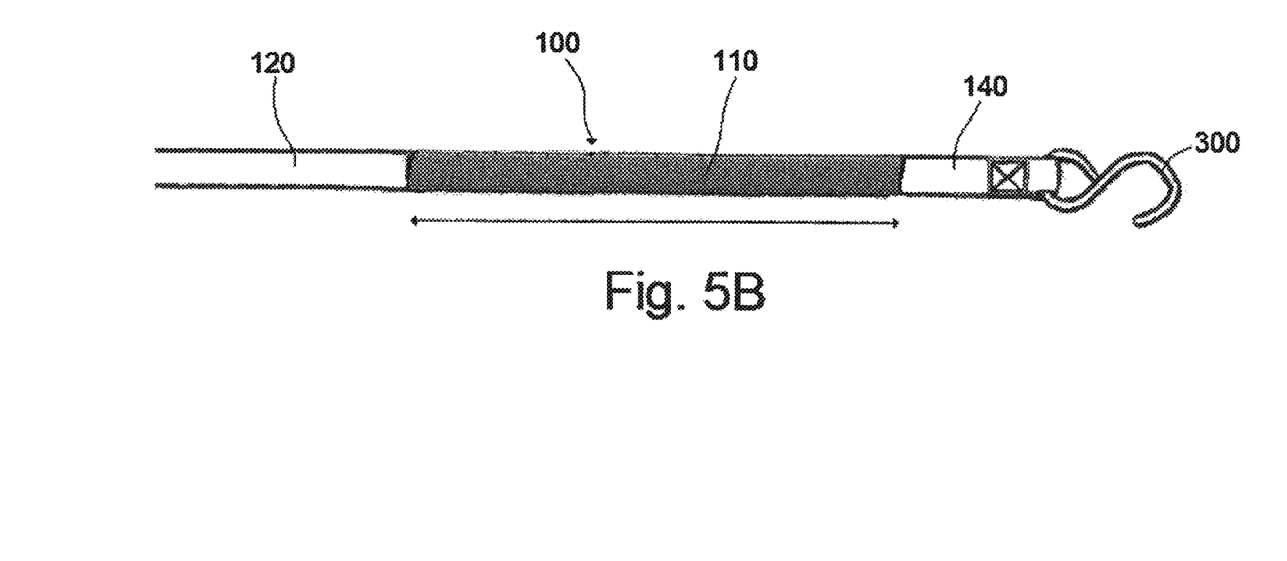
FIG. 5B is a perspective view of the embodiment of the present invention depicted in FIG. 5A with the elastic portion of the strap in its stretched state.

The device of the present invention is used in the same manner as the prior art devices, namely, the strap is placed over the object or objects to be tied down, the ends are engaged with fixed anchor points, then the ratchet is used to take up the slack in the strap until the strap is taut over the object or objects intended to be secured. See FIG. 3A. However, with the present invention, the ratchet is continued to be used to stretch the elastic portion of the strap to between about half of its total stretchable length and one hundred percent of its total stretchable length. In the preferred embodiment the elastic portion of the strap is stretched to substantially one hundred percent of its total stretchable length. This introduces a self-adjusting mechanism to the device while in use. Thus, if the load is jostled (see FIG. 3B) the elastic portion of the strap will retract to retain tension on the load (see FIG. 3C). If the load alters its position slightly, the elastic portion will retract somewhat more, again maintaining tension on the load. It is important to remember that the elastic portion of the strap of the present invention requires a great deal of force to be stretched; therefore, under slight jostling there would be no appreciable changes in the length of the strap and it would act identically to straps in the prior art. But where the force is sufficiently great that it would have dislodged the load if secured by a prior art strap, the strap of the present invention will instead automatically reset the tension through refraction of its elastic portion.

Other features and advantages of the invention are described below.

DETAILED DESCRIPTION OF THE INVENTION

Figure 1A:
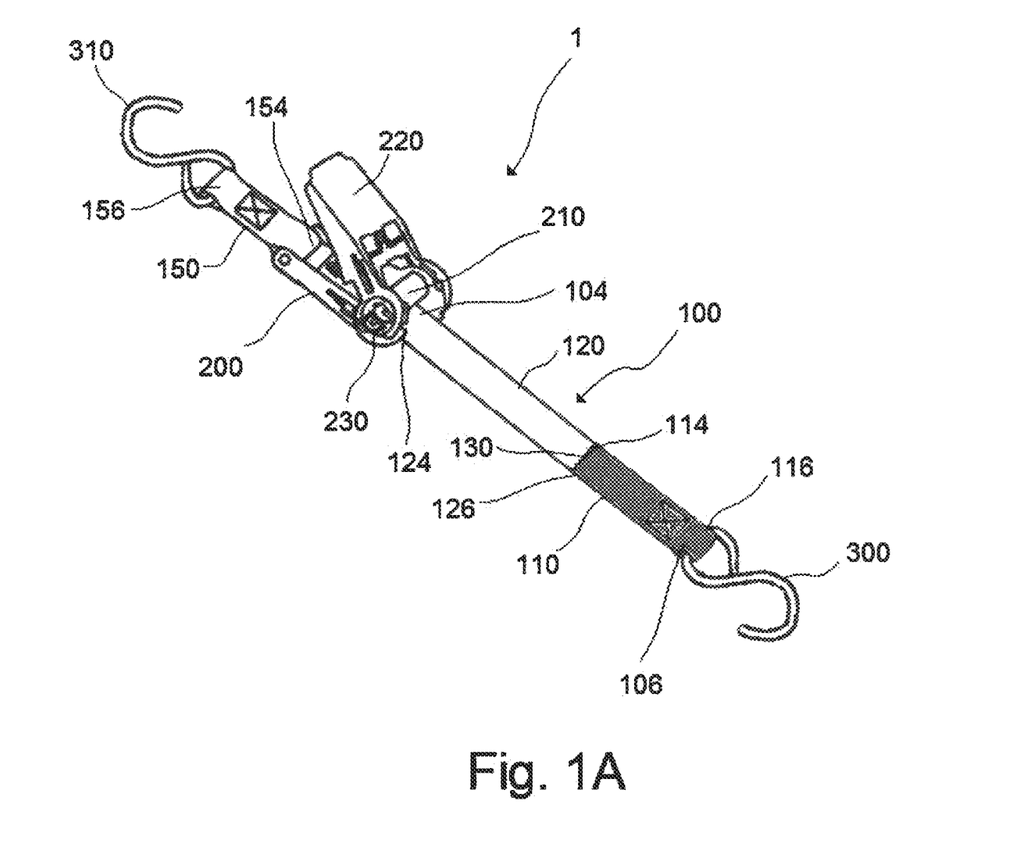
FIG. 1A is a perspective top view of one embodiment of the tie down device of the present invention.

FIG. 1A depicts one embodiment of the tie down device 1 of the present invention. The basic tie down device 1 comprises a strap 100, a ratchet mechanism 200, and an engagement member 300. A preferred embodiment further comprises an anchor strap 150 and a second engagement member 310.

The strap 100 of the present invention is elongate, substantially flat, and flexible, and is suitable for being used with a ratchet mechanism 200. The strap 100 has a length, a substantially uniform width, a proximate end 104, a distal end 106, an inelastic portion 120, and an elastic portion 110.

The inelastic portion 120 of the strap 100 has a length, a width, a proximate end 124, and a distal end 126. The inelastic portion 120 of the strap 100 is located at the proximate end 104 of the strap 100 and its length comprises the greater portion of the overall length of the strap 100. In the preferred embodiments the length of the inelastic portion 120 of the strap 100 comprises at least ninety percent of the overall length of the strap 100. The inelastic portion 120 of the strap 100 is constructed of a material having minimal longitudinal elongation capability along the length of the strap 100, though some very slight stretching might occur. In some embodiments the inelastic portion 120 of said strap 100 is constructed of polyester webbing. In other embodiments the inelastic portion 120 of said strap 100 is constructed of nylon webbing. Other materials having the described properties may also be used. The proximate end 124 of the inelastic portion 120 of the strap 100 engages with the ratchet mechanism 200, as described below. The distal end 126 of the inelastic portion 120 of the strap 100 engages with the elastic portion 110 of the strap 100, as described below.

The elastic portion 110 of the strap 100 has a length, a width, a proximate end 114, a distal end 116, an unstretched state, and a stretched state. The elastic portion 110 of the strap 100 is located at the distal end 106 of the strap 100 and its length comprises the lesser portion of the overall length of the strap 100. In the preferred embodiments the length of the elastic portion 110 of the strap 100 comprises at no more than ten percent of the overall length of the strap 100. The length of the elastic portion 110 of the strap 100 is capable of being lengthened while under tension to between one hundred twenty-five percent of its length to two hundred percent of its length in its unstretched state. In preferred embodiments the length of the elastic portion 110 of the strap 100 is capable of being lengthened while under tension to about one hundred fifty percent of its length in its unstretched state. The elastic portion 110 of the strap 100 is constructed of a material having elastomeric properties such that the elastic portion 110 of the strap 100 is capable of being stretched longitudinally along the length of the strap 100 when under tension, thereby achieving its stretched state. When said tension is removed the elastic portion 110 of the strap 100 is capable of reverting to its unstretched state. In some embodiment the elastic portion 110 of the strap 100 is constructed of natural rubber. In other embodiments the elastic portion 110 of the strap 100 is constructed of ethylene propylene diene monomer (EPDM). The elastic portion 110 of the strap 100 may be configured as braided elastic webbing or as a woven elastic webbing. Other materials having the described properties may also be used.

The proximate end 114 of the elastic portion 110 of the strap 100 is attached to the distal end 126 of the inelastic portion 120 of the strap 100. This may be achieved through the use of a mechanical fastener 130. This may be one or more rivets, or stitching, or any other means known in the art for mechanically joining the two portions of the strap 100. Alternatively, the proximate end 114 of the elastic portion 110 of the strap 100 may be attached to the distal end 126 of the inelastic portion 120 of the strap 100 by an adhesive. This may be created by a heat weld, or by the application of glue, or any other adhesive means. A combination of a mechanical fastener 130 and an adhesive may also be used to attach the proximate end 114 of the elastic portion 110 of the strap 100 to the distal end 126 of the inelastic portion 120 of the strap 100.

In an alternative embodiment, the strap 100 contains a second inelastic portion 140. See FIG. 1B. The second inelastic portion 140 of the strap 100 has a length, a width, a proximate end 144, and a distal end 146. The second inelastic portion 140 of the strap 100 is located at the distal end 106 of the strap 100 and its length is between fifty percent and two hundred percent of the length of the elastic portion 110 of the strap 100. In the preferred embodiments the length of the second inelastic portion 140 of the strap 100 is less than the length of the elastic portion 110 of the strap 100. The width of the second inelastic portion 140 of the strap 100 is substantially the same as the width of the inelastic portion 120 of the strap 100. The second inelastic portion 140 of the strap 100 is constructed of the same material as the inelastic portion 120 of the strap. The proximate end 144 of the second inelastic portion 140 of the strap 100 engages with the distal end 116 of the elastic portion 110 of the strap 100 by the same means as the distal end of the inelastic portion 120 of the strap 100 engages with the proximate end 114 of the elastic portion 110 of the strap 100, as described above.

The ratchet mechanism 200 is any ratchet mechanism known in the art which is suitable for engaging, retracting, retaining, and releasing the strap 100. Typically, the ratchet mechanism 200 will have a drum 210, a take-up handle 220, gearing, and a release latch 230. The drum 210 is capable of being rotated in a first direction by operation of said take-up handle 220 and prevented from counter-rotating by the gearing. The drum 210 is capable of being rotated in a second direction opposite the first direction by operation of the release latch 230, which disengages the gearing. The proximate end 124 of the inelastic portion 120 of the strap 100 is wrapped around the drum 210 when the drum 210 is rotated in the first direction. As more of the proximate end 124 of the inelastic portion 120 of the strap 100 is wrapped around the drum 210, the shorter the total effective length is of the strap 100. When the release latch 230 is used to disengage the gearing, a force pulling on the strap 100 will cause the drum 210 to rotate in the second direction resulting in the strap 100 unwinding from the drum 210, causing the effective length of the strap 100 to increase. The ratchet mechanism 200 is thus seen to be utilized to cause the strap 100 to be drawn taut over a load and to loosen the strap 100 from a load, as desired.

The engagement member 300 is any mechanism known in the art which is capable of being attached to the distal end 116 of the elastic portion 110 of the strap 100 and is suitable for engaging with an object 10. Typically, the engagement member 300 is a hook. This can include flat hooks, snap hooks, wire hooks, grab hooks, s-hooks, and other types of hooks. It can also include buckles, chains, and other grabbing devices. The engagement member 300 may be attached to the distal end 116 of the elastic portion 110 of the strap 100 by any suitable means. In one embodiment the engagement member 300 comprises a slot at one end, with the slot being just slightly wider than the width of the distal end 116 of the elastic portion 110 of the strap 100 so that the distal end 116 of the elastic portion 110 of the strap 100 can be inserted into and through the slot and folded back onto itself, and then secured by a mechanical fastener 130, an adhesive, or both. Other means for attaching the engagement member 300 to the distal end 116 of the elastic portion 110 of the strap 100 known in the art may also be used.

In the embodiments where a second inelastic portion 140 of the strap 100 is used, the engagement member 300 is attached to the distal end 146 of the second inelastic portion 140 of the strap 100, by the same means as the engagement member 300 is attached to the distal end 116 of the elastic portion 110 of the strap 100 where no second inelastic portion 140 of the strap 100 is used.

Where an anchor strap 150 and a second engagement member 310 are used, the anchor strap 150 is constructed of the same type of material as the inelastic portion 120 of the strap 100, and the second engagement member 310 may be configured substantially identically to the first engagement member 300. The anchor strap 150 has a length, a proximate end 154, and a distal end 156. The length of the anchor strap 150 is substantially less than the overall length of the strap 100. In some embodiments the length of the anchor strap 150 is less than ten percent of the overall length of the strap 100. The anchor strap 150 is attached at its proximate end 154 to the ratchet mechanism 200 by any suitable means. In one embodiment the ratchet mechanism 200 comprises a slot at one end, with the slot being just slightly wider than the width of the proximate end 154 of the anchor strap 150 so that the proximate end 154 of the anchor strap 150 can be inserted into and through the slot and folded back onto itself, and then secured by a mechanical fastener 130, an adhesive, or both. Other means for attaching the proximate end 154 of the anchor strap 150 to the ratchet mechanism 200 known in the art may also be used. The second engagement member 310 is attached to the distal end 156 of the anchor strap 150 by any suitable means. In one embodiment the second engagement member 310 is attached to the distal end 156 of the anchor strap 150 by the same means as the first engagement member 300 is attached to the distal end 116 of the elastic portion 110 of the strap 100, as described above. Other means for attaching the distal end 156 of the anchor strap 150 to the second engagement member 310 known in the art may also be used.

Figure 1B:
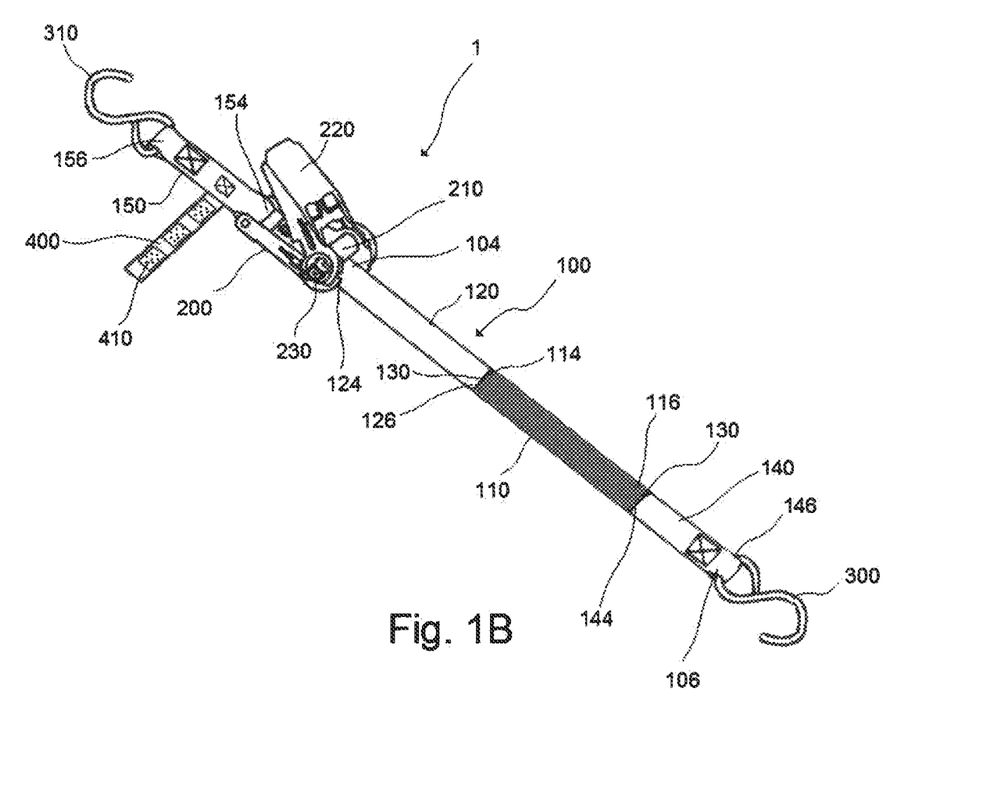
FIG. 1B is a perspective top view of another embodiment of the tie down device of the present invention.

In yet another embodiment of the present invention where an anchor strap 150 and a second engagement member 310 are used, the tie down device 1 includes a retention strap 400, see FIG. 1B. The retention strap 400 is used to retain the proximate end 104 of the strap 100 that extends from the ratchet mechanism 200. In the preferred embodiments the retention strap 400 has affixed to its surfaces hook and loop fasteners 410 such as Velcro™, allowing the retention strap 400 to be looped and secured to itself. So configured, the proximate end 104 of the strap 100 is folded onto itself and the retention strap 400 is wrapped around the folded proximate end 104 of the strap 100 and secured thereto. The retention strap 400 is preferably constructed of the same material as the elastic portion 110 of the strap 100, such that it can be pulled taut around the folded proximate end 104 of the strap 100. It may be made of other materials as well. In some embodiments the end of the retention strap may be secured to the anchor strap 150 as shown in FIG. 1B. The retention strap 400 may be secured using the same means as used to secure the distal end 126 of the inelastic portion 120 of the strap 100 to the proximate end 114 of the elastic portion 110 of the strap 100. Use of a retention strap 400 allows for the free proximate end 104 of the strap 100 to be kept in good order so that it does not flap about, for example, if the tie down device 1 is being used to secure a load to a moving vehicle. It can also be used to secure the entirety of the strap 100 in good order for storage purposes.

Modifications and variations can be made to the disclosed embodiments of the present invention without departing from the subject or spirit of the invention.

I claim:

1. A tie down device comprising a strap, a ratchet mechanism, and an engagement member, wherein said strap is suitable for being used with said ratchet mechanism, said strap having a length, a proximate end, a distal end, an elastic portion and a first inelastic portion, said elastic portion of said strap having a length, a width, a proximate end, a distal end, an unstretched state, and a stretched state, said elastic portion being located at the distal end of said strap, said elastic portion of said strap constructed of a material having elastomeric properties such that said elastic portion of said strap is capable of being stretched longitudinally along the length of said strap when under tension, thereby achieving its stretched state, and when said tension is removed said elastic portion of said strap is capable of reverting to its unstretched state, said first inelastic portion of said strap having a length, a width, a proximate end, and a distal end, said first inelastic portion of said strap comprising remaining portions of said strap not otherwise comprised of said elastic portion of said strap, said width of said first inelastic portion of said strap being substantially the same as said width of said elastic portion of said strap, and said first inelastic portion of said strap constructed of a material having minimal longitudinal elongation capability along the length of said strap;

said ratchet mechanism is suitable for engaging and retracting said strap, with said ratchet mechanism being comprised of a drum, a take-up handle, and a release latch, wherein said drum is capable of being rotated in a first direction by operation of said take-up handle and said drum is capable of being rotated in a second direction opposite the first direction by operation of said release latch, with said drum capable of accommodating the proximate end of said strap such that said proximate end of said strap is wrappable around said drum with said strap being wrapped around said drum when said drum is rotated in the first direction and said strap being unwrapped from said drum when said drum is rotated in the second direction; and said engagement member is suitable for engaging with an object, with said engagement member being located at the distal end of said strap.

2. The device of claim 1 wherein the length of said elastic portion of said strap while in its unstretched state is substantially shorter than the length of the first inelastic portion of said strap.

3. The device of claim 1 wherein the length of said elastic portion of said strap while in its unstretched state is less than ten percent of the length of the first inelastic portion of said strap.

4. The device of claim 1 wherein the length of the elastic portion of said strap is capable of being lengthened while under tension to between one hundred twenty-five percent and two hundred percent of the length of the elastic portion in its unstretched state.

5. The device of claim 1 wherein the proximate end of the elastic portion of said strap is attached to the distal end of the first inelastic portion of said strap by one or both of the group of: a mechanical fastener and an adhesive.

6. The device of claim 1 wherein the strap further comprises a second inelastic portion, said second inelastic portion of said strap having a length, a width, a proximate end, and a distal end, said width of said second inelastic portion of said strap being substantially the same as said width of the first inelastic portion of said strap, said length of said second inelastic portion of said strap being between fifty percent and two hundred percent of the length of the elastic portion of said strap, said second inelastic portion of said strap constructed of a material having minimal longitudinal elongation capability along the length of said strap, with said second inelastic portion of said strap being located at the distal end of the elastic portion of said strap, wherein the proximate end of said second inelastic portion of said strap is attached to the distal end of the elastic portion of said strap, and with the engagement member being located at the distal end of said second inelastic portion of said strap.

7. The device of claim 6 wherein the proximate end of the second inelastic portion of said strap is attached to the distal end of the elastic portion of said strap by one or both of the group of: a mechanical fastener and an adhesive.

8. The device of claim 1 wherein the engagement member is one of the group: flat hook, snap hook, wire hook, grab hook, s-hook, buckle, and chain.

9. The device of claim 1 wherein the engagement member is constructed of a substantially rigid material.

10. The device of claim 1 wherein the first inelastic portion of said strap is constructed of one of the group of: polyester webbing and nylon webbing.

11. The device of claim 6 wherein the second inelastic portion of said strap is constructed of one of the group of: polyester webbing and nylon webbing.

12. The device of claim 1 wherein the elastic portion of said strap is constructed of ethylene propylene diene monomer (EPDM).

13. The device of claim 1 further comprising an anchor strap and a second engagement member, said anchor strap having a length, a proximate end, and a distal end, said anchor strap being constructed of a material having minimal longitudinal elongation along the length of said anchor strap, said anchor strap being attached at its proximate end to said ratchet mechanism, said second engagement member being suitable for engaging with an object, and said second engagement member being located at the distal end of said anchor strap.

14. The device of claim 13 wherein the second engagement member is one of the group: flat hook, snap hook, wire hook, grab hook, s-hook, buckle, and chain.

15. The device of claim 13 wherein the second engagement member is constructed of a substantially rigid material.

16. The device of claim 13 wherein the length of said anchor strap is substantially shorter than the length of the first inelastic portion of said strap.

17. The device of claim 13 wherein the length of said anchor strap is less than ten percent of the length of the first inelastic portion of said strap.

18. The device of claim 13 wherein said anchor strap is constructed of one of the group of: polyester webbing and nylon webbing.

19. The device of claim 13 further comprising a retention strap, said retention strap suitably configured to retain the proximate end of the strap.

20. The device of claim 19 wherein said retention strap is attached to the anchor strap by one or both of the group of: a mechanical fastener and an adhesive.

* * * * *